(12) United States Patent
Milone

(10) Patent No.: US 8,966,973 B1
(45) Date of Patent: Mar. 3, 2015

(54) LOW COST CAPACITIVE LIQUID LEVEL SENSOR

(76) Inventor: Christopher J. Milone, Sewell, NJ (US)

( * ) Notice: Subject to any disclaimer, the term of this patent is extended or adjusted under 35 U.S.C. 154(b) by 794 days.

(21) Appl. No.: 13/027,820

(22) Filed: Feb. 15, 2011

(51) Int. Cl.
*G01F 23/26* (2006.01)

(52) U.S. Cl.
USPC .......................................................... 73/304 C

(58) Field of Classification Search
CPC ... G01F 23/268; G01F 23/266; G01F 23/263; G01F 23/265
USPC .......................................................... 73/304 C
See application file for complete search history.

(56) References Cited

U.S. PATENT DOCUMENTS

| | | | | |
|---|---|---|---|---|
| 2,563,363 | A * | 8/1951 | Preston | 451/445 |
| 4,083,038 | A * | 4/1978 | Klebanoff | 340/620 |
| 5,051,921 | A * | 9/1991 | Paglione | 702/52 |
| 6,490,920 | B1 * | 12/2002 | Netzer | 73/304 C |
| 7,258,005 | B2 | 8/2007 | Nyce | |
| 7,661,307 | B1 * | 2/2010 | Milone | 73/304 R |
| 2006/0238291 | A1 * | 10/2006 | Beck et al. | 338/200 |
| 2007/0030111 | A1 * | 2/2007 | Beck et al. | 338/35 |
| 2007/0132542 | A1 * | 6/2007 | Beck et al. | 338/35 |

OTHER PUBLICATIONS

"Metritape Operation Principle and Products", Jan. 3, 2011, www.jowa-usa.com/Metritape.htm, entire webpage.*

* cited by examiner

*Primary Examiner* — Hezron E Williams
*Assistant Examiner* — Rodney T Frank
(74) *Attorney, Agent, or Firm* — Burns & Levinson LLP; Jacob N. Erlich

(57) ABSTRACT

A capacitive liquid level sensor material, which includes a first thin, flexible, elongated insulating substrate of indeterminate length having a continuous sensing capacitor printed thereon. The sensing capacitor has a repeating interdigitated capacitive pattern formed by two separate electrodes printed on the substrate. There is a second thin, flexible, elongated insulating substrate of indeterminate length joined to the first substrate to electrically isolate the sensing capacitor, and the electrodes coplanar. The second substrate has a graphic ink pattern printed thereon. The joined first and second substrates are arranged to be wound up into a roll of at least several turns. The sensor material is then cut to length and terminated with a crimp type connector to produce a sensor of the desired length.

9 Claims, 7 Drawing Sheets

LOW COST CAPACITIVE LIQUID LEVEL SENSOR

BACKGROUND OF THE INVENTION

Various prior art fringing field capacitive liquid level detectors are known, such as from U.S. Pat. Nos. 6,490,920 and 7,258,005 and others. The prior art sensors are limited in length by mechanical limitations or electrical configuration.

SUMMARY OF THE PRESENT INVENTION

A fringing field capacitive liquid level sensor of the present invention has two coplanar electrodes rather than two parallel facing plates of a traditional uniform-field capacitor. The output capacitance of capacitive liquid level sensors is proportional to the level of the liquid in close proximity to the sensor. This is due to the difference in the dielectric constant of air vs. that of the liquid. Air has a low dielectric constant as compared with water, fuel, and other fluids which causes the capacitance to increase linearly as the level of fluid rises.

The present invention provides a low cost continuous fringing field capacitive liquid level sensor of unlimited length which can be formed into rolls of at least several turns and which can be cut to the desired length, terminated and installed in the tank or vessel to measure the level of the liquid of concern. The sensor can be employed either immersed in the liquid to be measured or on the exterior of the tank provided that the tank is not made of metal. Temperature effects are negligible with the present invention since the sensing capacitor is printed on a very thin flexible substrate and therefore does not require any significant compensation due to temperature extremes.

A uniform-field capacitive liquid level sensor could also be fabricated using similar techniques to achieve greater output capacitance than can be achieved with the fringing field type, if desirable. Two parallel facing electrodes could be printed on opposing sides of a flexible substrate to form the uniform field capacitor.

Varying tanks size requires sensors in various lengths to meet the desired application. The present invention employs a continuous capacitive sensor pattern printed on flexible insulating substrate (tape) such as polyethylene teraphthalate (PET) which allows the end user to cut the desired length of sensor for the application from a roll of sensor material. This material in rolls can be conveniently used to prepare sensors of varying length as and when desired which reduces the otherwise required of inventories of sensors of different lengths. For higher temperature applications other substrates could be employed such as polyethylene naphthalate (PEN) or polyimide (Kapton®). The sensor of desired length is then terminated with a crimp type connector such as the Crimpflex® connector and installed in the application. The Crimpflex® connector provides various connector options including solder tabs, male pins, female contacts, etc. The linear capacitance output of the resulting sensors can be processes to give the desired output signal through the use of various low-power, single-chip, capacitance-to-voltage or capacitance-to-digital converters readily available on the market today.

A single process is employed to create sensors of any length thereby minimizing costs associated with having different designs and layouts for the various length sensors, thereby doing away with unnecessary engineering and tooling costs. In addition, only one product needs to be stocked rather than having to maintain a stock of sensors of varying length which simplifies the inventory control process. This is useful to OEMs, particularly the automobile industry that employs tanks and vessels of varying dimensions and contents (fuel, antifreeze, windshield washer fluid, etc.) for the many different models they sell. Only a minimal lead time is required to produce custom length sensors for the many applications. Alternatively, OEMs could be provided with rolls of sensor material, Crimpflex® pins and crimping equipment and can produce sensors of various lengths on demand. The sensor material could also be printed with the OEMs company information and logo.

BRIEF DESCRIPTION OF THE DRAWINGS

These and other objects, features and advantages will be apparent from the following detailed description of preferred embodiments taken in conjunction with the accompanying drawings in which:

FIGS. 1, 1A and 1B show the completed sensor and the various components of the sensor.

DETAILED DESCRIPTION OF THE PREFERRED EMBODIMENTS

Figure 1:
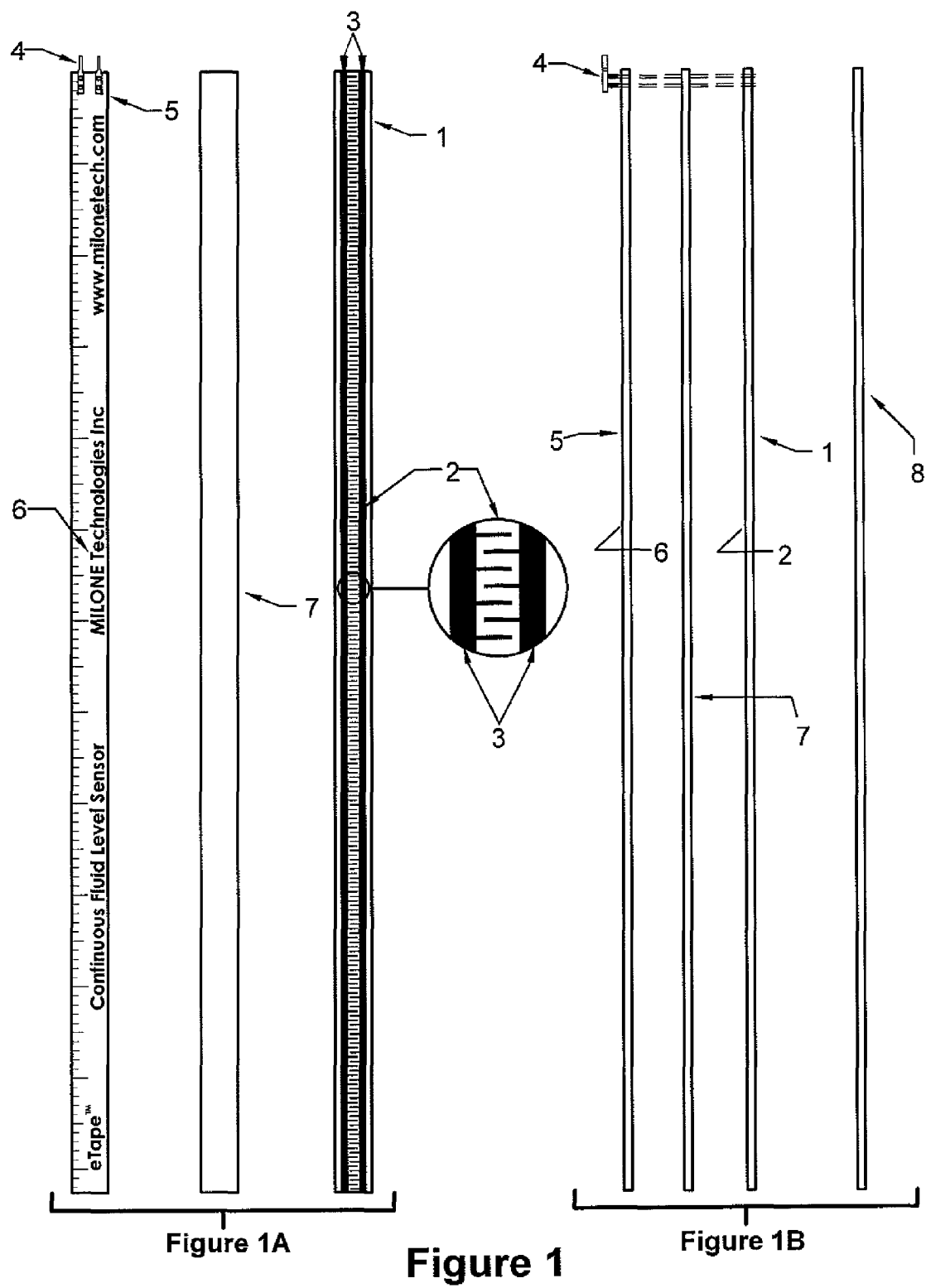

FIG. 1 shows the preferred embodiment of the present invention. The capacitive liquid level sensor is formed of an elongated insulating substrate 1 having a repeating interdigitated capacitive pattern 2 printed thereon. As shown by Nyce (U.S. Pat. No. 7,258,005), various other configurations and/or line widths and orientations could be employed to achieve the desired output capacitance. The capacitive pattern is formed by direct printing a conductive or resistive ink (metallic silver, carbon, etc.) using standard printing methods such as screen, inkjet, flexgraphic, gravure, etc. The pattern is printed in such a manner to allow the vertical conductors 3 to receive Crimpflex® pins 4 to make electrical contact with the capacitive pattern once the assembly is complete. The vertical conductors are printed at a width at least as wide as the width of the Crimpflex® pins being employed. Typically a second elongated flexible insulated substrate 5 is printed with a repeating graphic ink pattern 6 which includes gradations in inches or millimeters, along with product and company information and the like. The first and second substrate, 1 and 5, are joined together with an appropriate adhesive, heat sealable film 7 or other suitable bonding methods such as sonic welding. This serves to isolate the capacitive pattern to prevent direct contact with the liquid to inhibit the electrodes from being shorted by conductive liquids and/or contaminated or degraded by the liquid in which it is immersed. Alternatively, the capacitive and graphic ink patterns could be printed on a heat sealable substrate which would preclude the need for the intervening film 7, as would be the case if sonic welding was employed.

Figure 2:
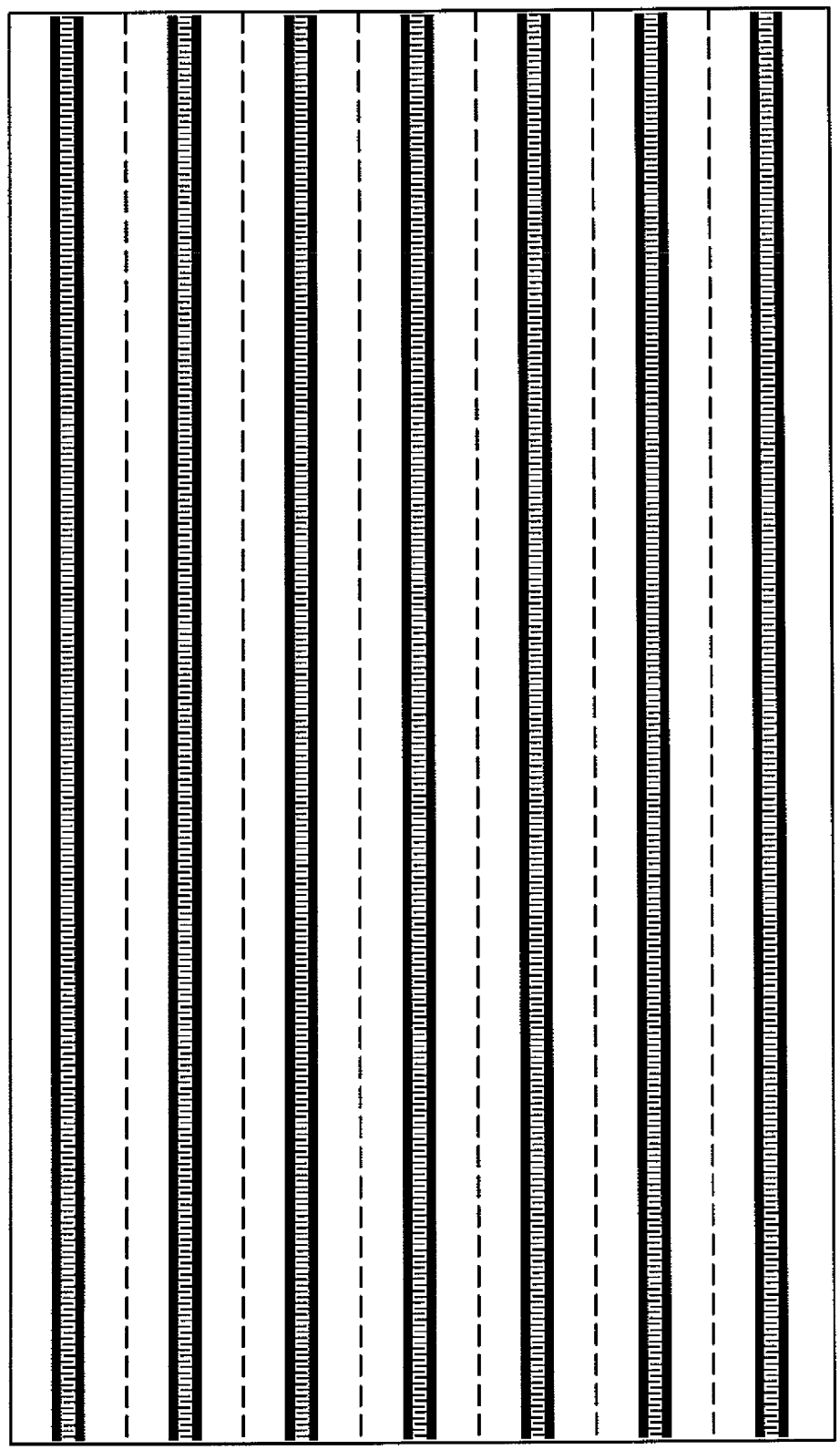
FIG. 2 shows several continuous capacitive patterns printed on a sheet of flexible substrate.

FIG. 2 shows several continuous capacitive patterns printed on a sheet of flexible substrate of a specified width that can be printed in a web (roll-to-roll) process to create sensors of unlimited length.

Figure 3:
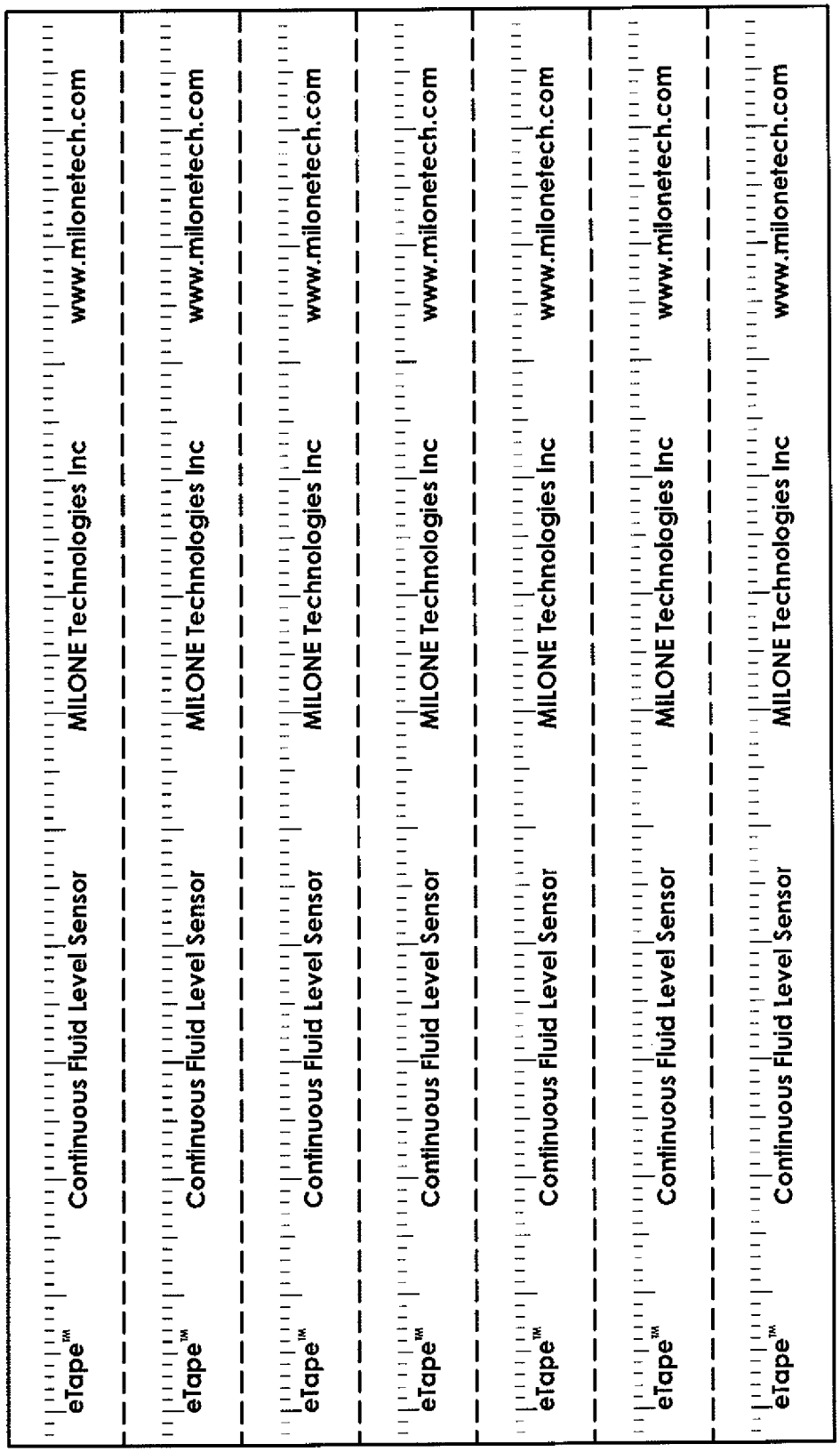
FIG. 3 shows a printed substrate similar to FIG. 2 with the repeating graphic ink pattern.

FIG. 3 shows a similar printed substrate with the repeating graphic ink pattern which is also printed in a roll-to-roll format.

Figure 4:
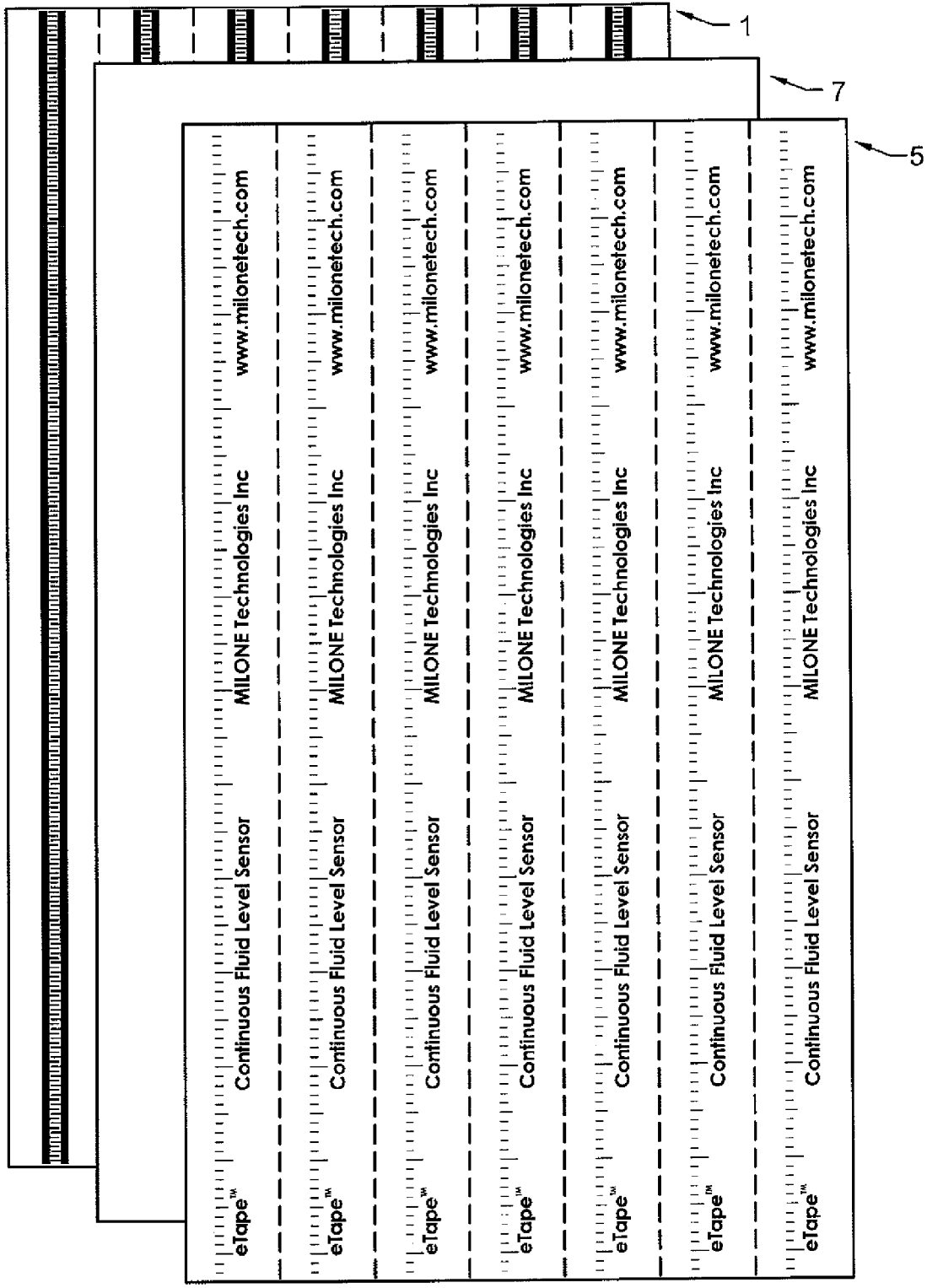
FIG. 4 shows the stack of the two printed substrates with an intervening adhesive or heat sealable layer.
Figure 5:
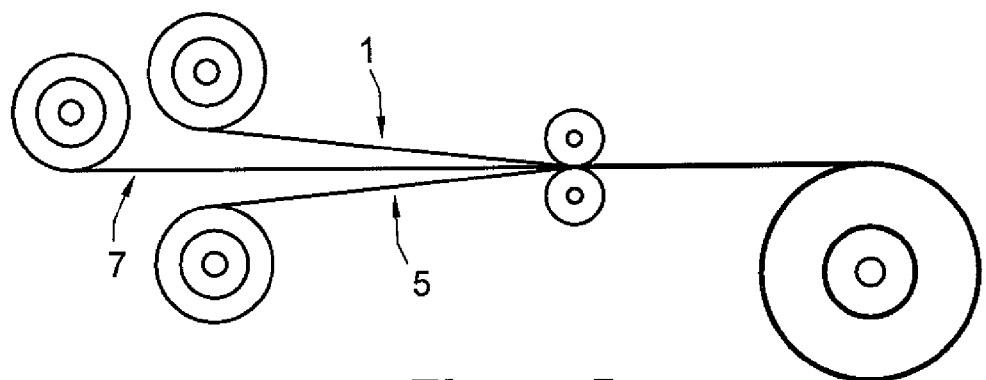
FIG. 5 is a schematic view showing the three layers being formed into a continuous sheet of sensor material being formed into a roll.
Figure 6:
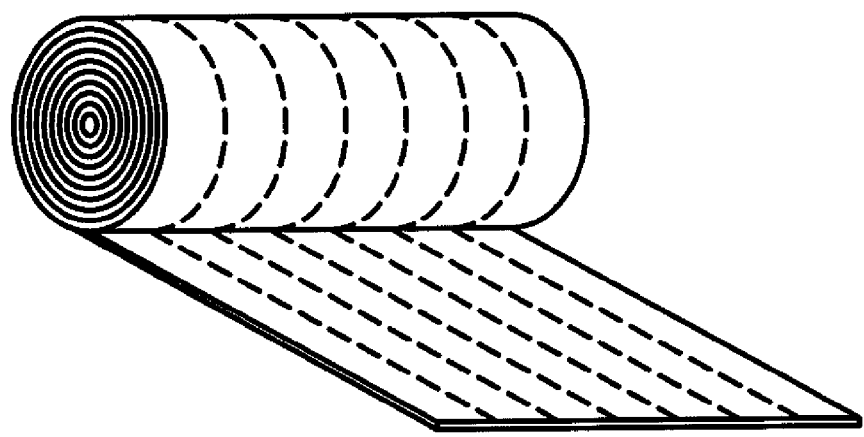
FIG. 6 shows the roll, the dotted lines indicated where the roll is slit to form individual sensor rolls.
Figure 7:
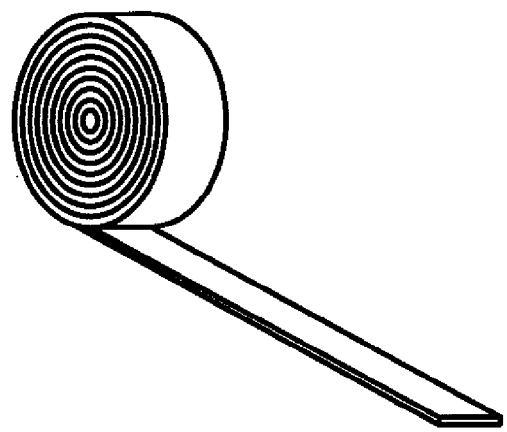
FIG. 7 shows an individual sensor roll.

FIG. 4 shows the stack up of the two printed substrates with an intervening double-sided adhesive film or heat sealable film, if required. The two rolls of material would then be laminated together as shown in FIG. 5 to form a roll of multiple sensors assemblies of unlimited length, FIG. 6, that is then slit along the dotted lines shown to form individual sensor rolls, FIG. 7.

Figure 8:
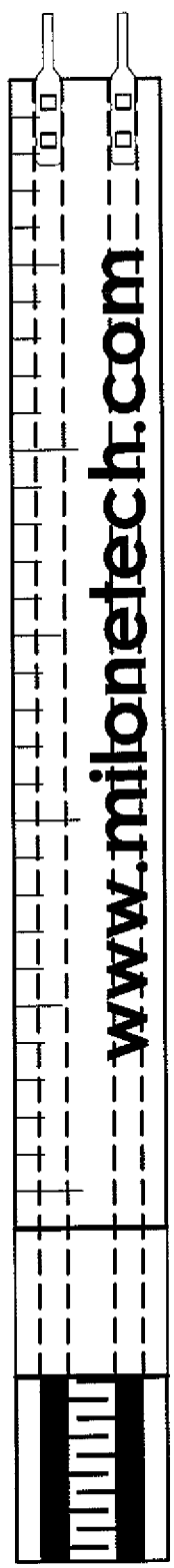
FIG. 8 shows an example of a completed sensor assembly cut to length.

FIG. 8 shows an example 4-inch completed sensor assembly cut to length with Crimpflex® pins terminated through the assembly. A cut away at the bottom of the sensor shows the sensor construction and Crimpflex® pin alignment.

Figure 9:
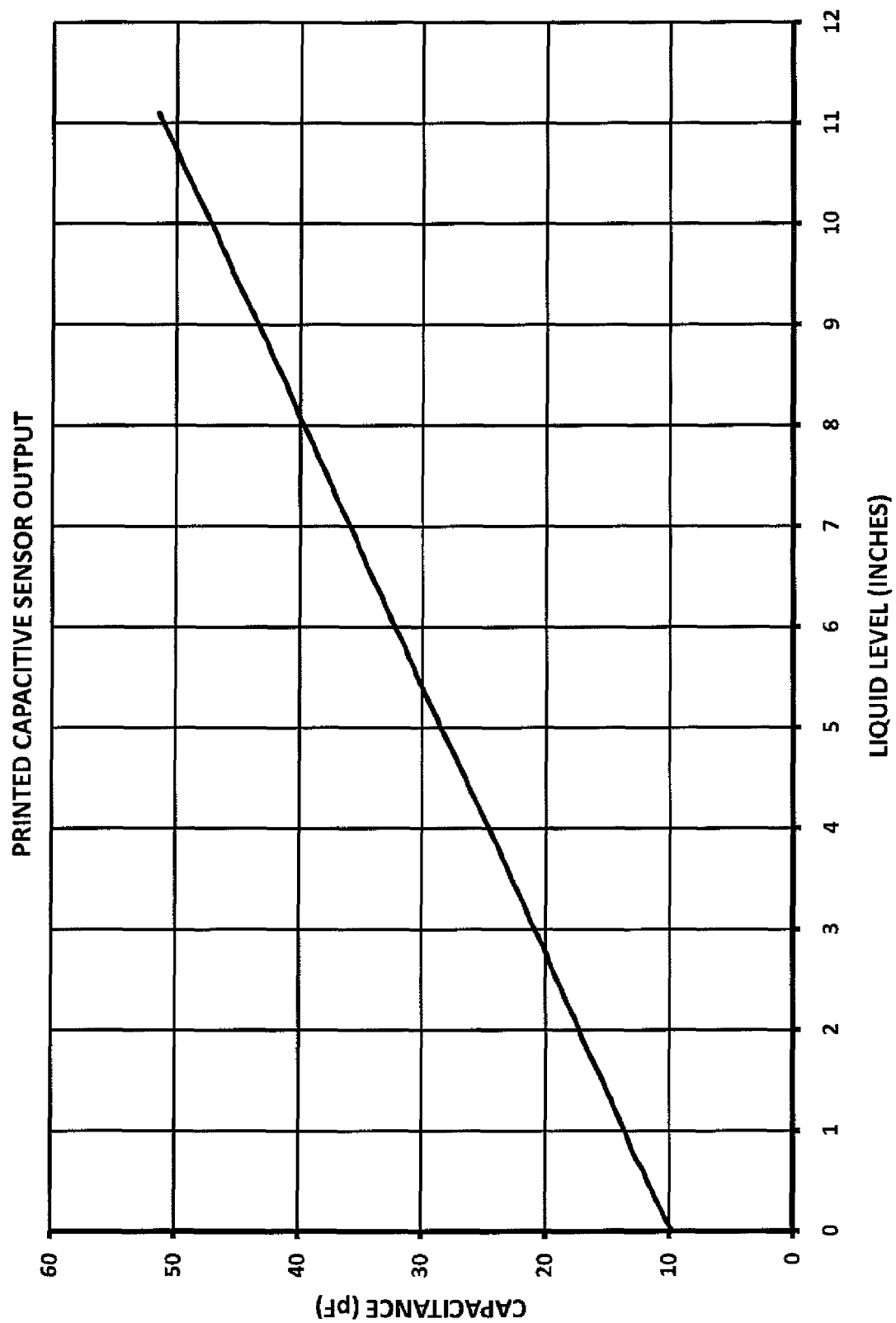
FIG. 9 shows the linear capacitive output of a beta 12-inch sensor.

FIG. 9 shows the linear capacitive output of a beta 12-inch sensor fabricated using screen printed silver on a 3 mil PET substrate heat sealed with an intervening PETg substrate. Sensor output capacitance was recorded for every 0.1 inch increase in liquid level. It was observed that the sensor provides a very linear capacitive output in the range of approximately 10 to 50 pF with an accuracy of approximately 0.25% as a percentage of full scale.

The capacitive pattern could also be formed using traditional flexible printed circuit board manufacturing process, whereby a flexible copper clad substrate is chemically etched to form the capacitive pattern.

Other techniques than those listed above could also be employed where the flexible substrate is printed with a catalyst which is then immersion plated with copper or other metals to form the capacitive pattern.

The capacitive sensor of the present invention does not need to have a conductive strip separated from the capacitive pattern to complete an electric circuit as is required in certain other types of liquid sensors It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A capacitive liquid level sensor material, comprising:
    first thin, flexible, elongated insulating substrate having a continuous sensing capacitor printed thereon, said continuous sensing capacitor comprising a repeating interdigitated capacitive pattern formed by two separate electrodes printed on said insulating substrate, and a second thin, flexible, elongated insulating substrate joined to the first insulating substrate to electrically isolate the continuous sensing capacitor as well as allowing the interdigitalized capacitive pattern to be cut to a variable desired length for a particular liquid environment, the electrodes being coplanar;
    wherein said second insulating substrate has a graphic ink pattern printed thereon.

2. A capacitive liquid level sensor as in claim 1 wherein the joined first and second substrates are arranged to be wound up into a roll of at least several turns.

3. A capacitive liquid level sensor as in claim 2 wherein the second substrate also isolates the sensing capacitor from liquids.

4. A capacitive liquid level sensor as in claim 2 wherein the substrates are joined together with adhesive.

5. A capacitive liquid level sensor as in claim 2 wherein the substrates are joined together with heat sealable film.

6. A capacitive liquid level sensor as in claim 2 wherein at least one of the capacitive pattern and the graphic ink pattern is printed on a heat sealable substrate.

7. A capacitive liquid level sensor as in claim 2 wherein the substrates are joined together with sonic welding.

8. A capacitive liquid level sensor as in claim 1 wherein the second substrate also isolates the sensing capacitor from liquids.

9. A combination for preparing capacitive liquid level sensors comprising:
    a first thin, flexible, elongated insulating substrate in a form wound up into a roll of at least several turns and having a continuous sensing capacitor printed thereon, said continuous sensing capacitor comprising a repeating interdigitated capacitive pattern formed by two separate electrodes printed on said first insulating substrate, each electrode having longitudinal conductors extending for the length of the roll and from which the parts forming the interdigitation capacitive pattern, and a second thin, flexible, elongated insulating substrate in a form wound up into a roll together with the first substrate and joined to the first substrate to electrically isolate the sensing capacitor as well as allowing the interdigitalized capacitive pattern to be cut to a variable desired length for a particular liquid environment, the electrodes being coplanar; and
    crimp type connectors for connection to the longitudinal conductors, the conductors being printed to be at least as wide as the crimp connectors, for use in forming completed sensors when the attached substrates are cut to a desired length to form the liquid level sensors.

* * * * *